United States Patent
Rued et al.

(10) Patent No.: US 10,001,083 B2
(45) Date of Patent: Jun. 19, 2018

(54) TURBOFAN AIRCRAFT ENGINE

(71) Applicant: MTU Aero Engines AG, Munich (DE)

(72) Inventors: Klaus Peter Rued, Groebenzell (DE); Werner Humhauser, Mossburg (DE); Hermann Klingels, Dachau (DE); Rudolf Stanka, Rattenkirchen (DE); Eckart Heinrich, Germering (DE); Hans-Peter Hackenberg, Olching (DE); Stefan Weber, Munich (DE); Claus Riegler, Karlsfeld (DE); Erich Steinhardt, Munich (DE); Jochen Gier, Karlsfeld (DE); Manfred Feldmann, Eichenau (DE); Norbert Huebner, Dachau (DE); Karl Maar, Pfaffenhofen an der Ilm (DE)

(73) Assignee: MTU Aero Engines AG, Munich (DE)

( * ) Notice: Subject to any disclaimer, the term of this patent is extended or adjusted under 35 U.S.C. 154(b) by 572 days.

(21) Appl. No.: 14/335,107

(22) Filed: Jul. 18, 2014

(65) Prior Publication Data

US 2016/0017797 A1 Jan. 21, 2016

(51) Int. Cl.
  *F02K 3/02* (2006.01)
  *F02C 3/107* (2006.01)

(52) U.S. Cl.
  CPC .............. *F02K 3/025* (2013.01); *F02C 3/107* (2013.01)

(58) Field of Classification Search
  CPC ..... F02K 3/04; F02K 3/06; F02K 3/02; F02K 3/025; F02K 3/065; F02K 3/068; F02K 3/075; F05D 2200/21; F05D 2200/22; F05D 2200/221; F05D 2250/70; F05D 2250/80; F01D 5/12; F01D 5/14; F02C 3/107
  See application file for complete search history.

(56) References Cited

U.S. PATENT DOCUMENTS

| | | | |
|---|---|---|---|
| 8,246,292 B1 * | 8/2012 | Morin | F02C 3/107 415/1 |
| 2012/0291449 A1 * | 11/2012 | Adams | F02C 7/36 60/793 |
| 2013/0192196 A1 * | 8/2013 | Suciu | F02K 3/06 60/226.1 |

FOREIGN PATENT DOCUMENTS

WO   WO 2014055103 A1 * 4/2014 ............... F02K 3/06

OTHER PUBLICATIONS

Pratt & Whitney, A United Technologies Company. PurePower Engine Family Specs Chart, Published on Sep. 16, 2012, Avialable from http://www.pratt-whitney.com/Content/PurePowerPW1000G_Engine/pdf/B-1-1_PurePowerEngineFamily_SpecsChart.pdf, Retrieved on Sep. 28, 2016.*

* cited by examiner

Primary Examiner — Woody Lee, Jr.
Assistant Examiner — Sang K Kim
(74) Attorney, Agent, or Firm — Davidson, Davidson & Kappel, LLC

(57) ABSTRACT

A turbofan aircraft engine having a primary duct (C), including a combustion chamber (BK), a first turbine (HT) disposed downstream of the combustion chamber, a compressor (HC) disposed upstream of the combustion chamber and coupled (W1) to the first turbine, and a second turbine (L) disposed downstream of the first turbine and coupled (W2) via a speed reduction mechanism (G) to a fan (F) for feeding a secondary duct (B) of the turbofan aircraft engine. A square of a ratio of a maximum blade diameter ($D_F$) of the fan to a maximum blade diameter ($D_L$) of the second turbine is at least 3.5, in particular at least 4.

14 Claims, 1 Drawing Sheet

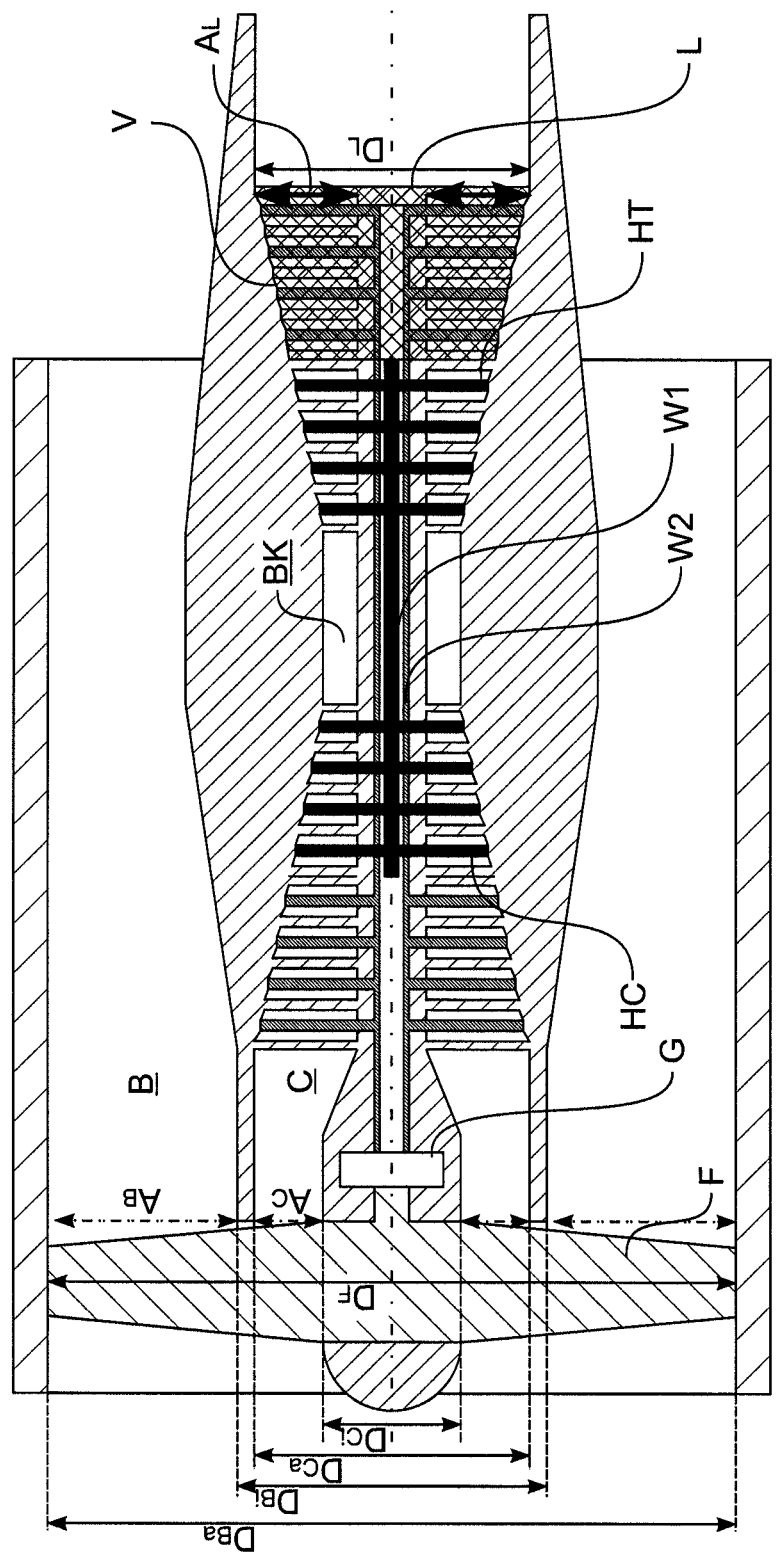

TURBOFAN AIRCRAFT ENGINE

The present invention relates to a turbofan aircraft engine having a primary duct including a combustion chamber, a first turbine disposed downstream of the combustion chamber, a compressor disposed upstream of the combustion chamber and coupled to the first turbine, and a second turbine disposed downstream of the first turbine and coupled via a speed reduction mechanism to a fan for feeding a secondary duct. The invention further relates to a passenger jet for at least ten passengers which has a turbofan aircraft engine of this type, as well as to a method for designing such a turbofan aircraft engine.

BACKGROUND

Today, most engines of modern passenger jets are turbofan aircraft engines. In order to increase the efficiency thereof and/or to reduce noise emission, so-called "geared turbofans" are known from in-house practice. In such geared turbofans, the fan and the turbine driving it are coupled via a speed reduction mechanism.

This provides new degrees of freedom in the design of the engine components, so that the fan and the turbine driving it have heretofore been designed relatively independently of each other.

SUMMARY OF THE INVENTION

It is an object of the present invention to provide an improved passenger jet.

The present invention provides a turbofan aircraft engine having a primary duct (C) including a combustion chamber (BK), a first turbine (HT) disposed downstream of the combustion chamber, a compressor (HC) disposed upstream of the combustion chamber and coupled (W1) to the first turbine, and a second turbine (L) disposed downstream of the first turbine and coupled via a speed reduction mechanism (G) to a fan (F) for feeding a secondary duct (B) of the turbofan aircraft engine, wherein a square of a ratio of a maximum blade diameter ($D_F$) of the fan to a maximum blade diameter ($D_L$) of the second turbine is at least 3.5, in particular at least 4.

In accordance with one aspect of the present invention, a turbofan aircraft engine thus has a primary gas duct (hereinafter also referred to as "primary duct") for a so-called "core flow." The primary duct includes a combustion chamber, in which, in an embodiment, air that is drawn-in and compressed is burned together with supplied fuel during normal operation. The primary duct includes a first turbine which is located downstream, in particular immediately downstream, of the combustion chamber and which, without limiting generality, is hereinafter also referred to as "high-pressure turbine". The axial location information "downstream" refers in particular to a through-flow during, in particular, steady-state operation and/or normal operation. The first turbine or high-pressure turbine may have one or more turbine stages, each including a rotor blade array and preferably a stator vane array downstream or upstream thereof, and is coupled, in particular fixedly connected, to a compressor of the primary duct such that they rotate at the same speed. The compressor is preferably disposed immediately upstream of the combustion change and, without limiting generality, is hereinafter also referred to as "high-pressure compressor". The high-pressure compressor may have one or more stages, each including a rotor blade array and preferably a stator vane array downstream or upstream thereof. The high-pressure compressor, combustion chamber and high-pressure turbine together form a so-called "core engine."

The turbofan aircraft engine has a secondary duct, which is preferably arranged fluidically parallel to and/or concentric with the primary duct. A fan is disposed upstream of the secondary duct to draw in air and feed it into the secondary duct. The fan may have one or more axially spaced-apart rotor blade arrays; i.e., rows of rotor blades distributed, in particular equidistantly distributed, around the circumference thereof. A stator vane array may be disposed upstream and/or downstream of each rotor blade array of the fan. In one embodiment, the fan is an upstream-most or first or forwardmost rotor blade array of the engine, while in another embodiment, the fan is a downstream-most or last or rearwardmost rotor blade array of the engine ("aft fan"). In one embodiment, the fan is adapted or designed to feed also the primary duct and/or is preferably disposed immediately upstream of the primary duct and/or the secondary duct. At least one additional compressor may be disposed between the fan and the first compressor or high-pressure compressor. Without limiting generality, the additional compressor is also referred to as "low-pressure compressor."

The fan is coupled via a speed reduction mechanism to a second turbine of the primary duct. The second turbine is disposed downstream of the high-pressure turbine and, without limiting generality, is hereinafter also referred to as low-pressure turbine. The second turbine or low-pressure turbine may have one or more turbine stages, each including a rotor blade array and preferably a stator vane array downstream or upstream thereof. In one embodiment, at least one additional turbine may be disposed between the high-pressure and low-pressure turbines. In one embodiment, the fan and the low-pressure turbine may be coupled via a low-pressure shaft disposed concentrically with a hollow shaft, which couples the high-pressure compressor and the high-pressure turbine. The speed reduction mechanism may include a transmission, in particular, a single- or multi-stage gear drive. In one embodiment, the speed reduction mechanism may have an in particular fixed speed reduction ratio of at least 2:1, in particular at least 3:1, and/or no greater than 11:1, in particular no greater than 4:1, between a rotational speed of the low-pressure turbine and a rotational speed of the fan. As used herein, a speed reduction mechanism is understood to mean, in particular, a non-rotatable coupling which converts a rotational speed of the low-pressure turbine to a lower rotational speed of the fan.

In accordance with one aspect of the present invention, a square $$\left(\frac{D_F}{D_L}\right)^2$$

of a ratio $$\left(\frac{D_F}{D_L}\right)$$

of a maximum blade diameter $D_F$ of the fan to a maximum blade diameter $D_L$ of the second turbine or low-pressure turbine is at least 3.5, in particular at least 3.7, preferably at least 4:

$$\left(\frac{D_F}{D_L}\right)^2 \geq 3.5 \text{ or } \left(\frac{D_F}{D_L}\right)^2 \geq 3.7 \text{ or } \left(\frac{D_F}{D_L}\right)^2 \geq 4 \qquad (1)$$

In accordance with the present invention, by selecting a suitable relationship between the initially substantially independent design parameters of maximum blade diameter of the fan and maximum blade diameter of the low-pressure turbine, it is possible to design a turbofan aircraft engine that is particularly advantageous, in particular low-noise, efficient and/or compact. As used herein, a (maximum) blade diameter is understood to mean, in particular, a (maximum) radial distance between opposite blade tips; i.e., a (maximum) diameter of a (largest) rotor blade array.

In accordance with the present invention, a particularly advantageous, in particular low-noise, efficient and/or compact turbofan aircraft engine can be designed if, in addition, or as an alternative, to this advantageous absolute value range, an initially substantially independent bypass area ratio $$\left(\frac{A_B}{A_C}\right)$$

of an inlet area $A_B$ of the secondary duct to an inlet area $A_C$ of the primary duct is taken into account in the selection of the square $$\left(\frac{D_F}{D_L}\right)^2$$

of the maximum blade diameter of the fan to the maximum blade diameter of the second turbine. As used herein, an inlet area of the primary or secondary duct is understood to mean, in particular, the flow-through cross-sectional area at the inlet of the primary or secondary duct, preferably downstream, in particular immediately downstream, of the fan and/or at the same axial position.

In accordance with one aspect of the present invention, a sum $$1 + \frac{\left(\frac{A_B}{A_C}\right)}{K}$$

of one and a quotient $$\frac{\left(\frac{A_B}{A_C}\right)}{K}$$

of the bypass area ratio $$\left(\frac{A_B}{A_C}\right)$$

of an inlet area of the secondary duct to an inlet area of the primary duct divided by a coefficient K defines an upper and/or lower limit for the square $$\left(\frac{D_F}{D_L}\right)^2$$

of the ratio of the maximum blade diameter of the fan to the maximum blade diameter of the second turbine.

In particular, in one embodiment, the square $$\left(\frac{D_F}{D_L}\right)^2$$

of the ratio of the maximum blade diameter of the fan to the maximum blade diameter of the second turbine is at least equal to the sum of one and the quotient of the bypass area ratio divided by 3.6, in particular divided by 3.2.

$$1 + \frac{\left(\frac{A_B}{A_C}\right)}{3.6} \leq \left(\frac{D_F}{D_L}\right)^2 \text{ or } 1 + \frac{\left(\frac{A_B}{A_C}\right)}{3.2} \leq \left(\frac{D_F}{D_L}\right)^2 \text{ or} \qquad (2)$$

$$K = 3.6 \text{ or } 3.2$$

Preferably, the bypass area ratio is greater than $$6.5 \left(\left(\frac{A_B}{A_C}\right) > 6.5\right).$$

In one embodiment, additionally or alternatively, the square $$\left(\frac{D_F}{D_L}\right)^2$$

of the ratio of the maximum blade diameter of the fan to the maximum blade diameter of the second turbine is no greater than the sum of one and the quotient of the bypass area ratio divided by 2.6, in particular divided by 2.8:

$$1 + \frac{\left(\frac{A_B}{A_C}\right)}{2.6} \geq \left(\frac{D_F}{D_L}\right)^2 \text{ or } 1 + \frac{\left(\frac{A_B}{A_C}\right)}{2.8} \geq \left(\frac{D_F}{D_L}\right)^2 \text{ or} \qquad (3)$$

$$K = 2.6 \text{ or } 2.8$$

Preferably, the bypass area ratio is greater than $$6.5 \left(\left(\frac{A_B}{A_C}\right) > 6.5\right).$$

In accordance with the present invention, by balancing the initially substantially independent design parameters of maximum blade diameter of the fan, maximum blade diameter of the low-pressure turbine, and bypass area ratio according to the present invention, it is possible to design a turbofan aircraft engine that is particularly advantageous, in particular low-noise, efficient, light and/or compact.

In accordance with the present invention, a particularly advantageous, in particular low-noise, efficient, light and/or compact turbofan aircraft engine can be designed if, in addition, or as an alternative, to these advantageous absolute or relative value ranges for the square of the ratio of the maximum blade diameter of the fan to the maximum blade diameter of the second turbine, an initially substantially independent volume V defined or bounded by an outer wall of the second turbine; i.e., of the primary duct between the entrance cross section and the exit cross section of the second turbine, is designed, in particular limited, according to a parabolic function $a \cdot D_F^2 + b \cdot D_F + c$ of the maximum blade diameter $D_F$ of the fan.

Accordingly, in accordance with one aspect of the present invention, a sum of a product $a \cdot D_F^2$ of a square $D_F^2$ of the maximum blade diameter $D_F$ of the fan and a first constant a, a product $b \cdot D_F$ of the maximum blade diameter of the fan and a second constant b, and a third constant c is, in absolute value, at least being equal to volume V of the outer wall of the primary duct; i.e., of its second turbine between the entrance cross section and the exit cross section thereof, with the first constant a being at least 0.1 m, and preferably being equal to 0.15 m, the second constant b being no greater than −0.1 m², preferably being equal to −0.28 m², and the third constant c being no greater than 0.5 m³, and preferably being equal to 0.24 m³ and the maximum blade diameter $D_F$ in [m] and the volume V in [m³] being:

$$V[m^3] \leq a \cdot D_F^2[m^2] + b \cdot D_F[m] + c \quad (4)$$

where:
a≥0.1 m, in particular a=0.15 m and
b≤−0.1 m², in particular b=−0.28 m² and
c≤0.5 m³, in particular c=0.24 m³

By balancing the initially substantially independent design parameters of maximum blade diameter of the fan and housing volume of the low-pressure turbine according to the present invention, it is possible to design a turbofan aircraft engine that is particularly advantageous, in particular low-noise, efficient, light and/or compact.

In accordance with the present invention, a particularly advantageous, in particular low-noise, efficient, light and/or compact turbofan aircraft engine can be designed if, in addition, or as an alternative, to these advantageous relative value ranges for the maximum blade diameter $D_F$ of the fan, an absolute minimum size of at least 1.2 m is defined for it.

In one embodiment, the second turbine or low-pressure turbine has no more than 5, in particular no more than 4, stages or axially spaced-apart rotor blade arrays coupled to the fan.

In accordance with the present invention, a particularly advantageous, in particular low-noise, efficient, light and/or compact turbofan aircraft engine can be designed if, in addition, or as an alternative, to these advantageous absolute or relative value ranges for the maximum blade diameter $D_F$ of the fan, a minimum size is defined for an exit area $A_L$ of the second turbine, this minimum size being dependent on the maximum allowable rotational speed n. As used herein, an exit area of the second turbine or of the primary duct is understood to mean, in particular, the flow-through cross-sectional area at the exit of the primary duct or of a downstream-most array of rotor blades or stator vanes of the low-pressure turbine. The term "maximum allowable rotational speed" is understood herein to mean, in particular, the so-called redline speed, which is the maximum rated speed of the engine; i.e., the maximum speed permitted during operation.

In particular, in one embodiment, the product $A_L \cdot n^2$ of the exit area $A_L$ of the second turbine and the square $n^2$ of the maximum allowable rotational speed n of the second turbine is at least 8000 m²/s², in particular at least 9000 m²/s².

A turbofan aircraft engine according to the present invention may in particular be advantageously used as an engine for a passenger jet for at least 10 passengers. Accordingly, one aspect of the present invention relates to a passenger jet for at least 10 passengers, which has at least one turbofan aircraft engine as described herein and is designed or certified for a cruising altitude of at least 1,200 m and/or no more than 15,000 m and/or a cruising speed of at least 0.4 Ma and/or no more than 0.9 Ma.

Another aspect of the present invention relates to a method for designing and manufacturing a turbofan aircraft engine according to the present invention, which satisfies one or more of the aforedescribed conditions, in particular of the above equations (1) through (4).

In addition, a particularly advantageous, in particular low-noise, efficient, lighter and/or compact passenger jet can be provided by selecting, as described above, suitable design parameters, which, in the case of geared turbofans, can initially be selected substantially independently of one another, in particular by selecting a square of a ratio of a maximum blade diameter of the fan to a maximum blade diameter of the second turbine, as proposed by the present invention.

BRIEF DESCRIPTION OF THE DRAWINGS

Further preferred features of the present invention will become apparent from the dependent claims and from the following description of preferred embodiments.

To this end, the only drawing, FIG. 1, shows, in partially schematic form, a turbofan aircraft engine of a passenger jet according to an embodiment of the present invention.

DETAILED DESCRIPTION

FIG. 1 depicts a turbofan aircraft engine of a passenger jet in accordance with an embodiment of the present invention, the engine having a primary duct C containing a combustion chamber BK. The primary duct has a first turbine or high-pressure turbine HT, which is located immediately downstream (to the right in FIG. 1) of the combustion chamber and includes a plurality of turbine stages. The high-pressure turbine is fixedly coupled to a high-pressure compressor HC of the primary duct via a hollow shaft W1, and hence such that they rotate at the same speed, the high-pressure compressor being disposed immediately upstream of the combustion chamber. As used herein, a coupling providing for rotation at the same speed is understood to mean, in particular, a non-rotatable coupling having a constant gear ratio equal to one, such as is provided, for example, by a fixed connection.

The turbofan aircraft engine has a secondary duct B, which is arranged fluidically parallel to and concentric with the primary duct. A fan F is disposed immediately upstream of the primary and secondary ducts (to the left in FIG. 1) to draw in air and feed it into the primary and secondary ducts. An additional compressor or low-pressure compressor is disposed between the fan and the high-pressure compressor.

The fan is connected through a speed reduction mechanism including a transmission G and via a low-pressure shaft W2 to a second turbine or low-pressure turbine L of the primary duct. The low-pressure turbine includes a plurality of turbine stages and is disposed downstream of the high-pressure turbine (to the right in FIG. 1). The hollow shaft W1 is concentric with the low-pressure shaft W2.

The square $$\left(\frac{D_F}{D_L}\right)^2$$

of the ratio $$\left(\frac{D_F}{D_L}\right)$$

of the maximum blade diameter $D_F$ of the fans to the maximum blade diameter $D_L$ of the low-pressure turbine is at least equal to $$4\left(\left(\frac{D_F}{D_L}\right)^2 \geq 4\right).$$

Moreover, the square $$\left(\frac{D_F}{D_L}\right)^2$$

is in a range between the sum $$1 + \frac{\left(\frac{A_B}{A_C}\right)}{3.2}$$

of one and the quotient $$\frac{\left(\frac{A_B}{A_C}\right)}{3.2}$$

of the bypass area ratio $$\left(\frac{A_B}{A_C}\right)$$

of the inlet area $$A_B = (D_{Ba}^2 - D_{Bi}^2) \cdot \frac{\pi}{4}$$

of the secondary duct (indicated by a double-dot-dash line in FIG. 1) to the inlet area $$A_C = (D_{Ca}^2 - D_{Ci}^2) \cdot \frac{\pi}{4}$$

of the primary duct (indicated by a dot-dash line in FIG. 1) divided by 3.2 and the sum $$1 + \frac{\left(\frac{A_B}{A_C}\right)}{2.8}$$

of one and the quotient $$\frac{\left(\frac{A_B}{A_C}\right)}{2.8}$$

of the bypass area ratio $$\left(\frac{A_B}{A_C}\right)$$

divided by 2.8, with $D_{Ba}$ being the outer diameter and $D_{Bi}$ being the inner diameter of the entrance cross section of the secondary duct, $D_{Ca}$ being the outer diameter and $D_{Ci}$ being the inner diameter of the entrance cross section of the primary duct $$\left(1 + \frac{\left(\frac{A_B}{A_C}\right)}{3.2} \leq \left(\frac{D_F}{D_L}\right)^2 \leq 1 + \frac{\left(\frac{A_B}{A_C}\right)}{2.8}\right),$$

wherein the bypass area ration is greater than $$6.5\left(\left(\frac{A_B}{A_C}\right) > 6.5\right).$$

Volume V, which is defined by the outer wall of the second turbine; i.e., of the primary duct between the entrance cross section and the exit cross section of the second turbine, and is shown hatched in FIG. 1, is less than the value of the parabolic function ($V$ [m³]≤0.15 m·$D_F^2$−0.28 m²·$D_F$+0.24 m³ ($D_F$ in [m])).

Maximum blade diameter $D_F$ is at least 1.2 m. The low-pressure turbine has only 4 stages. The product $A_L·n^2$ of the exit area $A_L$ of the second turbine and the square $n^2$ of the maximum allowable rotational speed n of the second turbine is at least 8000 m²/s².

Although the above is a description of exemplary embodiments, it should be noted that many modifications are possible. It should also be appreciated that the exemplary embodiments are only examples, and are not intended to limit scope, applicability, or configuration in any way. Rather, the foregoing description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS $A_B$ inlet area of the secondary duct
$A_C$ inlet area of the primary duct
$A_L$ exit area of the low-pressure turbine B secondary duct (bypass)
BK combustion chamber
C primary duct (core)
$D_{Ba}$ outer diameter of the secondary duct
$D_{Bi}$ inner diameter of the secondary duct
$D_{Ca}$ outer diameter of the primary duct
$D_{Ci}$ inner diameter of the primary duct
$D_F$ maximum blade diameter of the fan
$D_L$ maximum blade diameter of the low-pressure turbine
F fan
G transmission (speed reduction mechanism)
HC (high-pressure) compressor
HT first turbine or high-pressure turbine
L second turbine or low-pressure turbine
V volume
W1 hollow shaft
W2 low-pressure shaft

What is claimed is:

1. A turbofan aircraft engine comprising:
a primary duct including a combustion chamber;
a first turbine disposed downstream of the combustion chamber;
a compressor disposed upstream of the combustion chamber and coupled to the first turbine; and
a second turbine disposed downstream of the first turbine and coupled via a speed reduction mechanism to a fan for feeding a secondary duct of the turbofan aircraft engine,
a square of a ratio of a maximum blade diameter of the fan to a maximum blade diameter of the second turbine being at least 3.5;
wherein a sum of (i) a product of a square of the maximum blade diameter of the fan in $[m^2]$ and 0.15 m, (ii) a product of the maximum blade diameter of fan in [m] and $-0.28$ $m^2$, and (iii) 0.2 $m^3$ is, in absolute value, equal to at least a volume of the primary duct bounded by an outer wall of the second turbine between the entrance cross section and the exit cross section in $[m^3]$ thereof.

2. The turbofan aircraft engine as recited in claim 1 wherein the square of the ratio of the maximum blade diameter of the fan to the maximum blade diameter of the second turbine is at least 4.

3. The turbofan aircraft engine as recited in claim 1 wherein the square of the ratio of the maximum blade diameter of the fan to the maximum blade diameter of the second turbine is no greater than the sum of one and a quotient of a bypass area ratio of the inlet area of the secondary duct to the inlet area of the primary duct divided by 2.6.

4. The turbofan aircraft engine as recited in claim 1 wherein the square of the ratio of the maximum blade diameter of the fan to the maximum blade diameter of the second turbine is equal to at least the sum of one and a quotient of a bypass area ratio of the inlet area of the secondary duct to the inlet area of the primary duct divided by 3.2.

5. The turbofan aircraft engine as recited in claim 1 wherein the maximum blade diameter of the fan is at least 1.2 m.

6. The turbofan aircraft engine as recited in claim 1 wherein the second turbine has no more than 5 stages.

7. The turbofan aircraft engine as recited in claim 6 wherein the second turbine has no more than 4 stages.

8. The turbofan aircraft engine as recited in claim 1 wherein a product of an exit area of the second turbine in square inches and a square of a maximum allowable operating speed of the second turbine in rpms is at least 8000 $m^2/s^2$.

9. The turbofan aircraft engine as recited in claim 8 wherein a product of an exit area of the second turbine in square inches and a square of a maximum allowable operating speed of the second turbine in rpms is at least 9000 $m^2/s^2$.

10. A passenger jet aircraft for at least ten passengers comprising the turbofan aircraft engine as recited in claim 1.

11. The passenger jet aircraft as recited in claim 10 wherein the passenger jet has a cruising altitude of at least 1200 m and no more than 15000 m and/or a cruising speed of at least 0.5 Ma and no more than 0.9 Ma.

12. A method for manufacturing a turbofan aircraft engine as recited in claim 1 wherein the method comprises manufacturing the turbofan aircraft engine with maximum blade diameter of the fan and the maximum blade diameter of the second turbine are selected such that the square of the ratio of the maximum blade diameter of the fan to the maximum blade diameter of the second turbine is at least 3.3.

13. The method as recited in claim 12 wherein the square of the ratio of the maximum blade diameter of the fan to the maximum blade diameter of the second turbine is at least 4.

14. A method for manufacturing a turbofan aircraft engine as recited in claim 1 comprising: placing a first turbine downstream of the combustion chamber; placing a compressor upstream of the combustion chamber and coupling the compressor to the first turbine; placing a second turbine downstream of the first turbine and coupling the second turbine via a speed reduction mechanism to a fan for feeding a secondary duct of the turbofan aircraft engine.

* * * * *